United States Patent Office 3,129,103
Patented Apr. 14, 1964

3,129,103
INK COATING FOR PRESSURE SENSITIVE
TRANSFER RECORD SHEET
Robert W. Martel and Howard G. Stroble, Dayton, Ohio, assignors to The National Cash Register Company, Dayton, Ohio, a corporation of Maryland
No Drawing. Filed May 16, 1960, Ser. No. 29,142
3 Claims. (Cl. 106—20)

This invention relates to a coating composition for a pressure-sensitive transfer sheet or ribbon and more particularly relates to a coating having a profusion of minute capsules, each capsule containing an ink solution in which are included a coloring material, a binder, and a solvent highly volatile at room temperatures.

Prior ink formulations have been limited to the use of a transfer agent or solvent which has a relatively low volatility, so as to prevent the ink from drying when exposed to room temperatures. When these inks are applied either to the backing of a transfer sheet or ribbon or to any surface, they are subject to smudging due to the solvent remaining in solution with the coloring material and the binder of the ink. The present invention contemplates an ink coating which when applied to a transfer sheet is smudge-proof in the normal handling of the transfer sheet and is instantaneously smudge-proof when transferred from the sheet or ribbon to any type of surface and particularly a non-porous surface. Such surfaces may include cellulose acetate and other cellulosic materials; glass; polyethylene; Teflon, which is tetrafluoroethylene; Mylar, a polyethylene terephthalate film produced by E. I. du Pont de Nemours and Company; and metals. Therefore, it is an object of this invention to provide an ink coating which is smudge-proof when applied either to a porous surface or to a non-porous surface.

It is another object of the invention to provide a transfer sheet or ribbon having an ink coating, which ink, when transferred to a porous surface, dries quickly to prevent bleed, and, when applied to a non-porous surface, dries quickly to prevent smearing.

With these and incidental objects in view, the invention includes certain novel features, the essential elements of which are set forth in appended claims and a preferred form or embodiment of which is described hereinafter.

In general, the present invention contemplates a pressure-sensitive ink-transfer material, one surface of which has deposited thereon a coating comprising a profusion of minute capsules, each capsule consisting of a core or liquid ink contained in a shell of polymer encapsulating material. The ink solution contains a coloring material and a binder dissolved in a highly volatile solvent which remains in liquid state while encapsulated. Upon impact or pressure against the transfer material by a printing or writing member, the capsules are ruptured, releasing the ink solution contained therein. The solvent transfers the coloring material to the surface of the material on which the transfer sheet is placed. After transferring the ink to the receiving surface, the solvent quickly evaporates, leaving a hard smudge-proof ink deposit.

A preferred process for making the capsules is that disclosed in the co-pending United States patent application of Bernard Katchen and Robert E. Miller, Serial No. 784,704, filed January 2, 1959, now Patent No. 3,041,289, and assigned to The National Cash Register Company. In this process, an internal phase of ink solution is first formed. An emulsion of ink sol-in-water is then made in which the dispersed phase units of ink solution each become the nucleus of a capsule and the external phase is an aqueous solution of at least three wall-forming colloid materials. These wall-forming materials are caused to separate out as colloid-rich phases, in steps, by the phenomenon of coacervation induced by changing the condition of the emulsion, the colloid-rich phase which first separates out depositing on the individual nuclei as seed points to form rudimentary minute capsules with colloid-rich liquid walls. The second phase separation deposits as complex colloid-rich liquid walls about clusters of the capsules. The colloid material finally is gelled to form capsules and clusters of capsules with solid walls. The phenomenon of coacervation by which such phase separation occurs is disclosed in United States Patent No. 2,800,457, which issued July 23, 1957, on the application of Barrett K. Green and Lowell Schleicher, and in United States Patent No. 2,800,458, which issued on the same day on the application of Barrett K. Green.

The material which forms the walls of the individual capsules and the encapsulating walls of the clusters of capsules should be of a wall-forming nature and soluble in water or other aqueous medium, which aqueous solution constitutes the medium in which the encapsulation of the core materials and the formation of encapsulated clusters of the capsules take place.

In the preferred embodiment, the internal or ink phase of the capsules is made up of a solution comprising 10½%, by weight, of finely-ground carbon black; 19½%, by weight, of Parlon, a chlorinated natural rubber manufactured and sold by Hercules Powder Company, of Wilmington, Delaware, United States of America; and 70%, by weight, of tetrachloroethylene. The chlorinated rubber has a viscosity of between 9 and 14 centipoises. A mixture of wall-forming material and internal phase is then made, under conditions of continuous agitation and a pH adjusted to at least 9, so that complex coacervation of coacervatable wall-forming materials is not possible, by emulsifying 160 grams of the internal phase in an aqueous solution of 10 grams of pigskin gelatin, having its iso-electric point at about pH 9, and 80 milliliters of water at 45 degrees centigrade, and this emulsion is mixed with a solution of 10 grams of gum arabic and 80 milliliters of water, the mixture being kept at a temperature above the gel point of the gelatin. This mixture is diluted with 553 grams of water heated to 45 degrees centigrade. The water-diluted mixture has added thereto 7.5 grams of a 2%, by weight, aqueous solution of polyethylenemaleic anhydride copolymer. This coacervatable mixture, still at or above pH 9 and at above 45 degrees centigrade, has added thereto a 12%, by weight, aqueous solution of acetic acid, drop by drop, with continued agitation, until a pH of 6 is reached. The ink droplets individually now have had deposited thereon a liquid capsular wall, consisting of some of the gelatin, gum arabic, and polyethylenemaleic anhydride copolymer, in a dense state, said deposit of material around the ink droplets having been caused by coacervate forces. At this point, the dense-liquid-walled rudimentary capsules, having ink cores, have clustered into small units with no wall around the individual clusters as a body. Now, after the capsules have formed such clusters having the desired size, the materials being kept at 45 degrees centigrade, and still being agitated, the pH is reduced to 4.5 with a 12%, by weight, aqueous solution of acetic acid, to cause coacervate deposition of the fractions of the polymeric material which did not deposit around the capsules at pH 6. The last deposition of polymeric material occurs as a dense-liquid wall around the cluster units, individually, to form encapsulated cluster units. The liquid-walled cluster units are kept as individual entities by agitation. Both the capsule walls and the cluster walls contain gelatin as a dense liquid polymer complex, with either the polyethylenemaleic anhydride copolymer or the gum arabic, or with both.

The clusters are next treated to solidify the polymeric material, both the capsule walls individually and the outer cluster walls, by cooling, to gel the deposited wall materials.

Further treatment may be given to the gelatin components to insolubilize them and raise the melting point thereof, and consequently of the total polymer complex, by subjecting such clusters to an aqueous solution of glutaraldehyde, or equivalent, which conveniently may be introduced into the dispersion of walled clusters in the residual aqueous medium when the latter is chilled. For the given amounts of material, 10 milliliters of a 25%, by weight, aqueous solution of glutaraldehyde is introduced into and stirred with the dispersion of capsule clusters. The walled clusters of capsules, so produced, are then ready for use as desired.

Another method for hardening the walled clusters of capsules, without the use of glutaraldehyde, is to introduce into the aqueous dispersion of walled clusters 1.9 milliliters of a 38%, by weight, aqueous solution of formaldehyde under continued agitation. After the clusters are gelled by cooling, the pH is raised to 9.5–10 to accelerate the formaldehyde action on the gelatin. In some instances, the raising of the pH of the residual aqueous medium to harden the walled clusters tends to cause more or less agglomeration of the walled clusters at the initiation of the hardening process. To avert this agglomeration, there is introduced into the dispersion of walled aggregates, before the pH is raised to 9.5–10, and while the mixture is still cool, 10 milliliters of a 5%, by weight, aqueous solution of polyethylenemaleic anhydride copolymer adjusted to pH 5, which copolymer will combine with the uncoacervated gelatin to render it ineffective as an agglomerating agent. A substitute for the polyethylenemaleic anhydride copolymer is polyvinylmethylethermaleic anhydride copolymer used in the same amounts and under similar conditions.

If it is desirable to eliminate any left-over materials used in the formation of the walled clusters, such may be done by filtering and washing processes common in the art. Thus, the dispersion of finished clusters may be repeatedly filtered and the clusters washed with water. The so-cleaned clusters may be re-dispersed in any liquid in which it is desirable to use them, or they may be dried in any manner desired, to remove the water, as by decanting, filtration, centrifuging, or subjecting them to hot or cold drying environments. This results in free-flowing clusters, which are like powdered material, as far as the unaided eye can see, although containing a large percentage of liquid, if such is the core contents. In the example at hand, enough water is added to or removed from the resulting capsule dispersion so that the viscosity of the fluid mixture is suitable for coating on the transfer sheet. This coating material is then coated on the transfer sheet and permitted to dry to form the apparently dry liquid-ink-containing transfer coating.

It is to be understood that the invention is not to be deemed limited to the encapsulating process nor the type of color-producing component or particular resin in the ink disclosed herein, as the main feature of the invention is to have present, in the coating, an ink solution containing a highly-volatile solvent which would normally evaporate instantaneously when exposed to room temperatures. Other coloring materials which may be substituted for the carbon black include Methyl Violet Base; Azo Blue Black B; Oil Black BT; and Hysol Blue B. Among the resins that may be used are polyterpene; 100% polymerized petroleum; and "Aroclor" 5460 and 5442, manufactured by Monsanto Chemical Company. As for the solvent, any comparable liquid-volatile solvent exhibiting the same properties as tetrachloroethylene may be used.

While the capsules disclosed herein are of the cluster type, other capsule structures may be used. As an example, the capsules may be made according to the process described in the previously-mentioned United States Patent No. 2,800,457, which issued on the application of Barrett K. Green and Lowell Schleicher on July 23, 1957. The resulting capsular structure should, in any case, be able to retain the highly-volatile tetrachloroethylene or other solvents.

The unique ink coating disclosed in this application through the use of the thick dense walls of capsules enables the novel volatile ink containing tetrachloroethylene as a solvent to be retained on the transfer member until the time of its use. This application enables the novel ink to be provided with highly-volatile solvents and resins which are particularly adaptable for printing on impervious surfaces. This is so because the resins dry quickly due to the presence of the highly-volatile solvent. In such applications, smudging is averted due to this quick drying action even though the ink is not absorbed in the pores of the surface of the receiving member. In those applications where the receiving surface is composed of porous material, this quick-drying property of the ink eliminates bleed, thus improving the printing qualities of the transfer operation.

What is claimed is:

1. Pressure-sensitive record material consisting of a base member having a surface on which is contained a coating which is dry to the touch and which consists of a profusion of microscopic pressure-rupturable liquid-containing capsules in substantial contiguity, each capsule having solid walls of gelled film-forming hydrophilic colloid material and each having encased therein a cluster of smaller capsules containing an ink solution having the characteristic of drying instantaneously when released from the capsules and transferred to a receiving surface, which ink solution includes coloring material, a binder material soluble in tetrachloroethylene, and tetrachloroethylene as a highly-evaporable solvent, the ink solution being a central nucleus around which has been deposited by coacervation a dense solvent-impermeable shell-like coating of the colloid material, the capsules being rupturable by printing or marking pressures applied to the coated base member to release the ink solution for transfer to the receiving surface.

2. An ink coating composition for a pressure-sensitive transfer member comprising a profusion of microscopic pressure-rupturable capsules dispersed in an aqueous vehicle, each of said capsules containing a solution of ink having the characteristic of drying instantaneously when released from the capsules and consisting of 10.5 parts, by weight, of carbon black, 19.5 parts, by weight, of chlorinated rubber, and 70 parts, by weight, of tetrachloroethylene.

3. Pressure-sensitive ink-transfer material consisting of a base member having a surface on which is contained a coating which is dry to the touch and which consists of a profusion of minute pressure-rupturable liquid-containing capsules in substantial contiguity, each capsule having solid walls of gelled film-forming hydrophilic colloid material and each having encased therein an ink solution having the characteristic of drying instantaneously when transferred to a receiving surface and which ink solution includes tetrachloroethylene as a highly-evaporable solvent, the ink solution being a central nucleus around which has been deposited a dense solvent-impermeable shell-like coating of the colloid material, the capsules being rupturable by printing or marking pressures applied to the coated base member to enable the ink to be transferred to the receiving surface.

References Cited in the file of this patent

UNITED STATES PATENTS

| 1,447,734 | Schwenterley | Mar. 6, 1923 |
| 2,800,457 | Green et al. | July 23, 1957 |
| 2,800,458 | Green | July 23, 1957 |
| 2,868,741 | Chambers et al. | Jan. 13, 1959 |

FOREIGN PATENTS

| 713,155 | France | Aug. 10, 1931 |